US009776348B2

United States Patent
Naruse et al.

(10) Patent No.: US 9,776,348 B2
(45) Date of Patent: Oct. 3, 2017

(54) MOTOR BOBBIN AND METHOD FOR MANUFACTURING SAME

(71) Applicant: DUPONT TEIJIN ADVANCED PAPERS (JAPAN), LTD., Tokyo (JP)

(72) Inventors: Shinji Naruse, Tokyo (JP); Tatsushi Fujimori, Tokyo (JP); Chihiro Kondo, Tokyo (JP); Yasunori Tanaka, Tokyo (JP)

(73) Assignee: DUPONT TEIJIN ADVANCED PAPERS (JAPAN), LTD., Tokyo (JP)

( * ) Notice: Subject to any disclaimer, the term of this patent is extended or adjusted under 35 U.S.C. 154(b) by 0 days.

(21) Appl. No.: 14/915,459

(22) PCT Filed: Jul. 24, 2014

(86) PCT No.: PCT/JP2014/069603
§ 371 (c)(1),
(2) Date: Feb. 29, 2016

(87) PCT Pub. No.: WO2015/033696
PCT Pub. Date: Mar. 12, 2015

(65) Prior Publication Data
US 2016/0214291 A1 Jul. 28, 2016

(30) Foreign Application Priority Data
Sep. 4, 2013 (JP) .................. 2013-183219

(51) Int. Cl.
*B29C 45/14* (2006.01)
*H01F 5/02* (2006.01)
(Continued)

(52) U.S. Cl.
CPC ........ *B29C 45/14639* (2013.01); *H01F 5/02* (2013.01); *H01F 27/325* (2013.01);
(Continued)

(58) Field of Classification Search
CPC ........ H02K 15/022; H02K 15/10; H02K 5/02; H02K 3/325; H02K 3/345; H02K 3/46;
(Continued)

(56) References Cited

U.S. PATENT DOCUMENTS 4,695,419 A * 9/1987 Inariba ................. H02K 15/022
264/259
6,075,304 A 6/2000 Nakatsuka
(Continued)

FOREIGN PATENT DOCUMENTS

DE 102008023923 1/2009
DE 102011006682 10/2012
(Continued)

OTHER PUBLICATIONS

International Search Report dated Oct. 21, 2014 in International Application No. PCT/JP2014/069603.
(Continued)

*Primary Examiner* — Tran Nguyen
(74) *Attorney, Agent, or Firm* — Wenderoth, Lind & Ponack, L.L.P.

(57) ABSTRACT

In a method for manufacturing a motor bobbin around which a coil is wound, an insulating sheet and a core material are disposed within the cavity of an injection mold, and the motor bobbin is formed by the injection mold into which a resin is injected. The motor bobbin consists of the insulating sheet and a resin molded body.

11 Claims, 5 Drawing Sheets

(51) Int. Cl.
| | |
|---|---|
| *H02K 15/10* | (2006.01) |
| *H02K 15/02* | (2006.01) |
| *H01F 27/32* | (2006.01) |
| *H01F 41/12* | (2006.01) |
| *H02K 3/30* | (2006.01) |
| *H02K 3/32* | (2006.01) |
| *H02K 1/04* | (2006.01) |
| *H02K 1/14* | (2006.01) |
| *H02K 3/34* | (2006.01) |
| *H02K 5/08* | (2006.01) |
| *H02K 15/14* | (2006.01) |
| *H02K 3/52* | (2006.01) |
| *B29L 31/34* | (2006.01) |

(52) U.S. Cl.
CPC ............ *H01F 41/125* (2013.01); *H02K 1/04* (2013.01); *H02K 1/148* (2013.01); *H02K 3/30* (2013.01); *H02K 3/325* (2013.01); *H02K 3/345* (2013.01); *H02K 5/08* (2013.01); *H02K 15/022* (2013.01); *H02K 15/10* (2013.01); *H02K 15/14* (2013.01); *B29L 2031/34* (2013.01); *H02K 3/522* (2013.01); *H02K 2203/12* (2013.01)

(58) Field of Classification Search
CPC   H02K 3/30; H01F 5/02; H01F 41/125; H01F 27/325; B29C 45/14639; B29C 45/14; B32B 5/26; B32B 27/08; B32B 27/12; B32B 27/28; B32B 27/34; H01B 3/006; H01B 3/48

See application file for complete search history.

(56) References Cited

U.S. PATENT DOCUMENTS

| | | | | |
|---|---|---|---|---|
| 6,121,388 | A * | 9/2000 | Umetsu | ............... C08K 5/092 |
| | | | | 525/425 |
| 7,939,975 | B2 * | 5/2011 | Saga | .................. H02K 3/522 |
| | | | | 310/43 |
| 2013/0127579 | A1 | 5/2013 | Ueno et al. | |
| 2014/0084742 | A1 | 3/2014 | Gudewer et al. | |

FOREIGN PATENT DOCUMENTS

| | | |
|---|---|---|
| JP | 5-038109 | 2/1993 |
| JP | 11-341714 | 12/1999 |
| JP | 2002-142399 | 5/2002 |
| JP | 2005-086950 | 3/2005 |
| JP | 2005-102454 | 4/2005 |
| JP | 2008-167590 | 7/2008 |
| JP | 2008-263704 | 10/2008 |
| JP | 2009-213311 | 9/2009 |
| JP | 2009-278839 | 11/2009 |
| JP | 2011-86801 | 4/2011 |
| JP | 2011-234537 | 11/2011 |

OTHER PUBLICATIONS

Extended European Search Report dated Mar. 17, 2017 in European Patent Application No. 14842229.8.

* cited by examiner

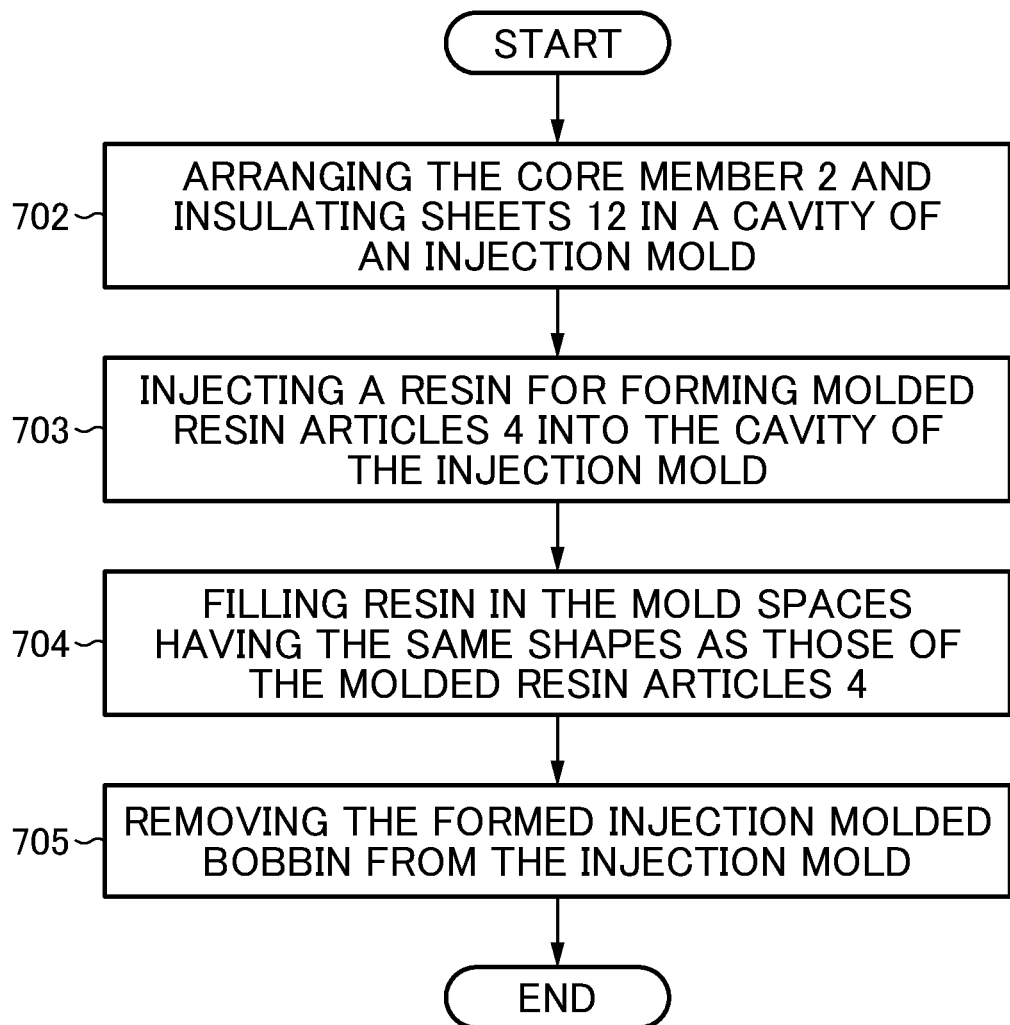

MOTOR BOBBIN AND METHOD FOR MANUFACTURING SAME

TECHNICAL FIELD

The present invention relates to a motor bobbin. More specifically, the present invention relates to a motor bobbin around which a coil is to be wound in a motor stator constituting a motor generator for a hybrid vehicle, an electric automobile, etc., or the like, and to a method for manufacturing the motor bobbin.

BACKGROUND ART

A motor generator functioning selectively as an electric motor and a power generator is mounted on a hybrid vehicle or an electric automobile. Such a motor generator includes, for example, a cylindrical rotor fixed to an output shaft supported rotatably around an axis, a motor stator having an inner peripheral surface away from an outer periphery surface of the rotor with a predetermined space provided therebetween, and a motor housing accommodating the motor stator. A motor stator constituting such a motor generator generally includes a core member and a coil. To insulate the core member and the coil from each other, the coil is wound around a motor bobbin, and the bobbin around which the coil is wound is fitted to the core member. Conventionally, such a motor bobbin is generally made of a synthetic resin, and, for example, polyphenylene sulfide or the like is used in a case of a concentrated winding stator (see, for example, Japanese Patent Application Publication Nos. 2005-102454 and 2002-142399). In addition, a method for integrally molding polyphenylene sulfide and a core member is disclosed (Japanese Patent Application Publication No. Hei 11-341714).

When, however, the bobbin is made of such a synthetic resin, the lower limit of the thickness of the bobbin is said to be about 0.6 mm, and the recent trends of motor generators and the like toward further increase in efficiency, increase in power output, and reduction in size are not necessarily sufficiently coped with. In addition, in the case of a large-sized motor generator used for a hybrid vehicle, an electric automobile, or the like, the method for integrally molding a synthetic resin and a core member has, for example, such a problem that the synthetic resin can hardly follow the expansion of the core member due to the change in surrounding temperature during the molding, so that cracks tend to be formed.

For the reduction in size under such circumstances, a motor bobbin has been proposed which comprises a bobbin body portion made of insulating paper and flange portions made of the insulating paper, wherein at least surfaces of the bobbin body portion and the flange portions made of the insulating paper to be in contact with a coil are made of an aromatic polyamide fiber (Japanese Patent Application Publication No. 2008-263704). In this technique, insulating paper sheets each having a structure in which heat-resistant sheets made of the aromatic polyamide fiber are provided on both of the top and bottom sides of a substrate with an adhesive agent interposed therebetween, and the adhesive agent used is an acrylic adhesive agent or a thermosetting resin composition containing an epoxy resin component, a phenolic resin component, or an acrylic resin component, and an imidazole-based curing agent component.

Here, a bobbin for a motor generator which is required to have a high efficiency and a large output has to fulfill the following five characteristics simultaneously:

1) being thin (small thickness);
2) preventing ground fault of a coil and a core member (high withstand voltage, partial discharge resistance);
3) withstanding heat generated by the coil (heat resistance);
4) having mechanical strength; and
5) having good and close contact with the core member to efficiently transmit heat generated by the coil to the core member (heat dissipation properties). In particular, the small thickness is considered to be extremely important in the sense that the thinner the bobbin is, the more the coil can be increased, so that the coil space factor can be increased, and the increase in power output can be achieved.

SUMMARY OF INVENTION

An object of the present invention is to provide a motor bobbin capable of coping with an increased efficiency and an increased power output of a motor generator or the like.

In view of such a circumstance, the present inventors have conducted intensive study to develop a motor bobbin capable of coping with an increased efficiency and an increased power output of a motor generator or the like, and consequently have accomplished the present invention.

In a first aspect, the present invention provides a method for manufacturing a motor bobbin around which a coil is to be wound, the method comprising forming the motor bobbin by injection molding wherein the insulating sheet and a core member are arranged in a cavity of an injection mold and a resin is injected into the cavity, wherein the motor bobbin comprises an insulating sheet and a molded resin article.

In a second aspect, the present invention provides the manufacturing method according to the first aspect, wherein the motor bobbin comprises a bobbin body portion which is at least partially made of the insulating sheet.

In a third aspect, the present invention provides the manufacturing method according to the first or second aspect, wherein the motor bobbin comprises a pair of the molded resin articles connected to both ends of the bobbin body portion.

In a fourth aspect, the present invention provides the manufacturing method according any one of the first to third aspects, wherein the insulating sheet and the molded resin article are connected and fixed to each other without using an adhesive agent.

In a fifth aspect, the present invention provides the manufacturing method according to any one of the first to fourth aspects, wherein a surface of the insulating sheet in contact with the molded resin article is impregnated with the molded resin article.

In a sixth aspect, the present invention provides the manufacturing method according to any one of the first to fifth aspects, wherein the molded resin article has a groove for positioning a coil.

In a seventh aspect, the present invention provides the method for manufacturing a motor bobbin according to any one of the first to sixth aspects, wherein the molded resin article and the insulating sheet are bonded to each other simultaneously with the molding of the molded resin article.

In an eighth aspect, the present invention provides the manufacturing method according any one of the first to seventh aspects, wherein
the molded resin article is formed by using a polymer having an amide bond, and
a surface of the insulating sheet in contact with the molded resin article is made of an aramid paper comprising an aramid fibrid and an aramid short fiber.

In a ninth aspect, the present invention provides a motor bobbin which is fabricated by the manufacturing method according to any one of the first to eighth aspects.

In a tenth aspect, the present invention provides a motor comprising a stator obtained by winding a coil around the motor bobbin according to the ninth aspect.

In an eleventh aspect, the present invention provides a motor generator comprising a stator obtained by winding a coil around the motor bobbin according to the ninth aspect.

In a twelfth aspect, the present invention provides a power generator comprising a stator obtained by winding a coil around the motor bobbin according to the ninth aspect.

BRIEF DESCRIPTION OF DRAWINGS

FIG. 7 shows fabrication of a bobbin in an injection mold.

DESCRIPTION OF EMBODIMENTS

Figure 1:
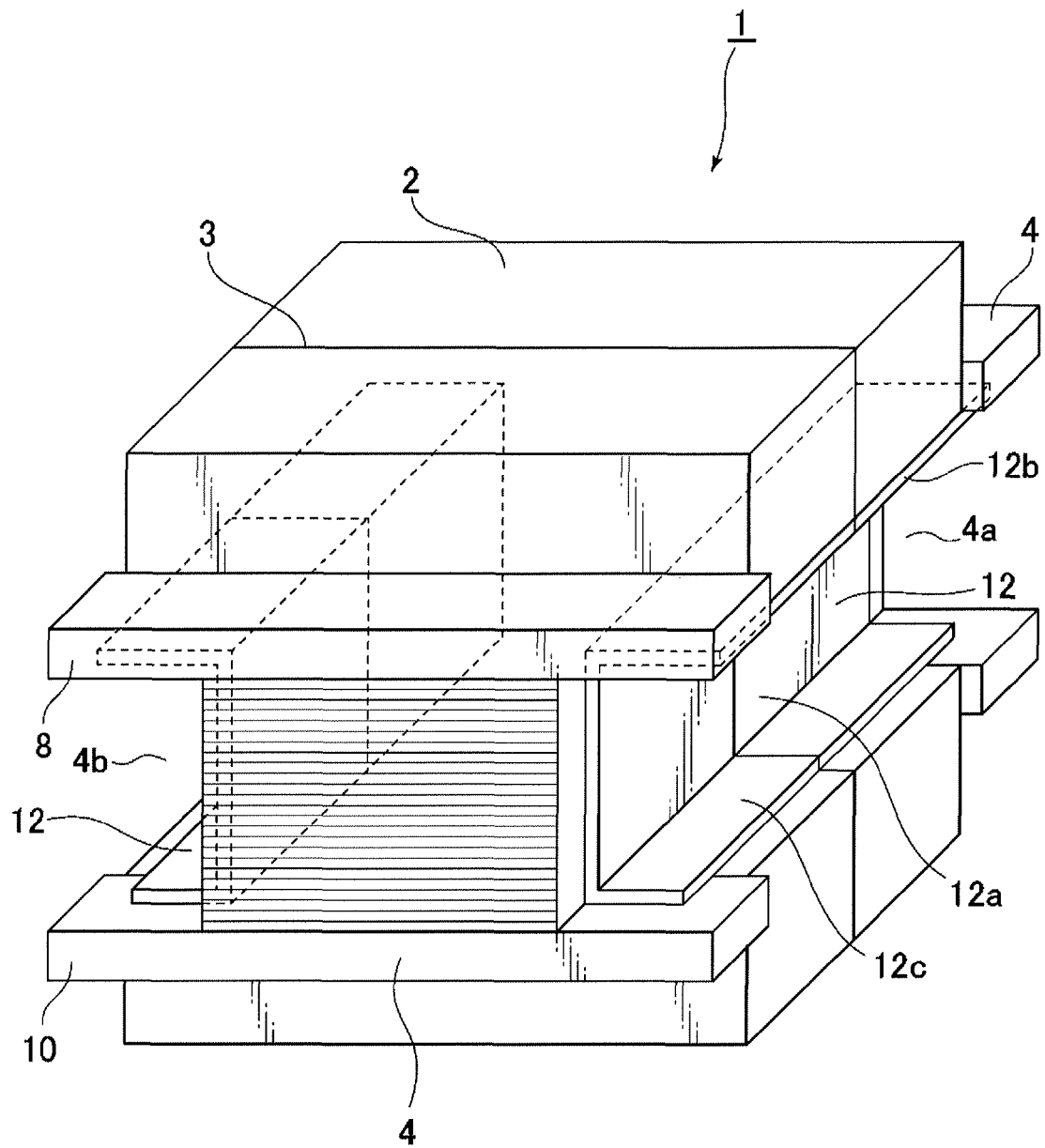
FIG. 1 is a perspective view of a motor bobbin including a core member according to an embodiment of the present invention.

Hereinafter, a motor bobbin of a preferred embodiment of the present invention will be described with reference to the drawings. However, the present invention is not particularly limited to this embodiment. FIG. 1 is a schematic perspective view showing a configuration of a motor bobbin 1 of the preferred embodiment of the present invention.

Figure 2:
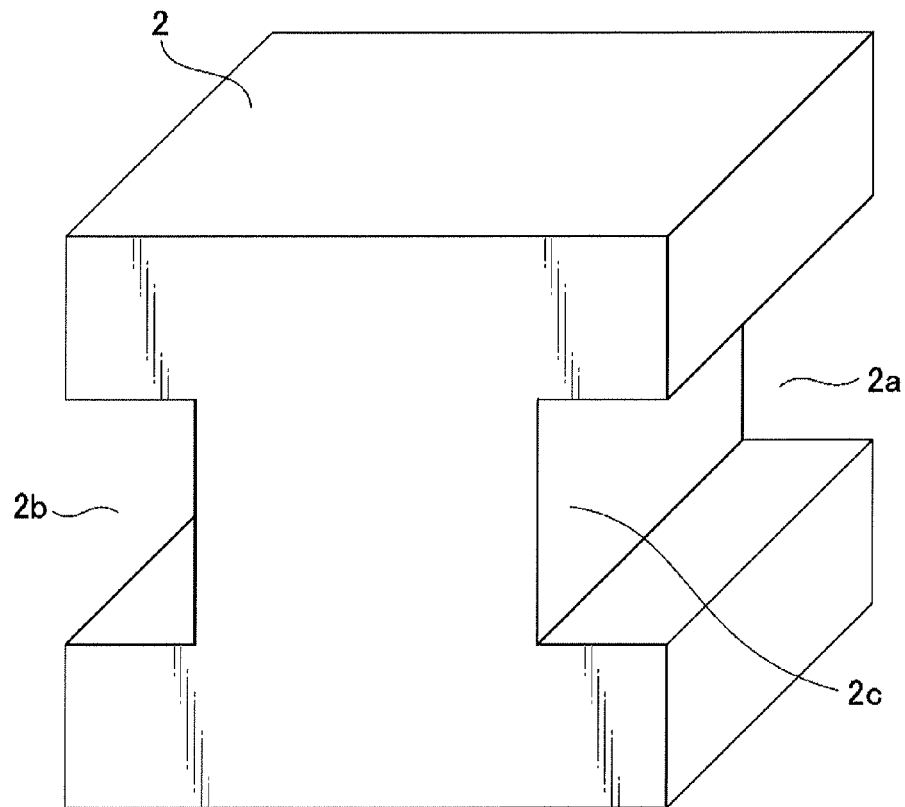
FIG. 2 is a perspective view of the core member of FIG. 1.

The motor bobbin 1 includes a core 2 formed of a metal such as a silicon steel plate. As shown in FIG. 2, the core 2 has a substantially cuboid shape. Specifically, in the core 2, groove portions 2a and 2b having rectangular cross sections and extending from the front to the back at center positions in a height direction of left and right sidewalls are formed, and accordingly the core 2 has a substantially H-shaped cross section.

Figure 3:
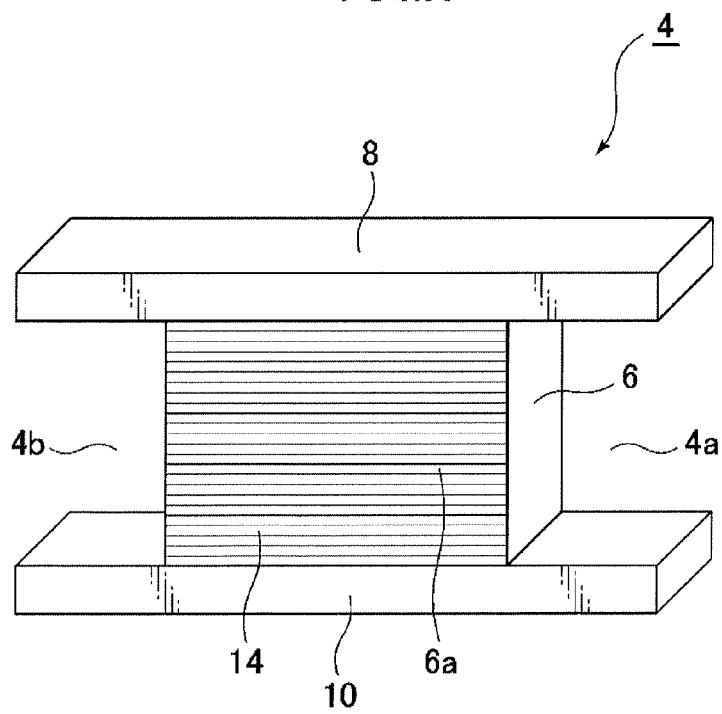
FIG. 3 is a perspective view of a molded resin article constituting the motor bobbin of FIG. 1.

As shown in FIG. 1, the bobbin 1 includes molded resin articles 4 arranged in front of and behind the core 2. As shown in a perspective view of FIG. 3, each molded resin article 4 has a cuboid main body portion 6 and an upper plate portion 8 and a lower plate portion 10 respectively arranged on upper and lower portions of the main body portion 6. In the motor bobbin 1 of this embodiment, the main body portion 6, the upper plate portion 8, and the lower plate portion 10 are formed integrally with each other by using a resin.

Each of the upper plate portion 8 and the lower plate portion 10 has a larger transverse dimension (width) than the main body portion 6 and has a substantially the same depth as that of the main body portion 6. Each of the upper plate portion 8 and the lower plate portion 10 is arranged on the upper and lower portions of the main body portion 6 in such a manner that both left and right side portions can extend outward from the main body portion 6. Consequently, also in the molded resin article 4, groove portions 4a and 4b are formed which have rectangular cross sections and which extend from the front to the back at center positions in a height direction of left and right sidewalls, and accordingly the molded resin article 4 has a substantially H-shaped cross section.

In the bobbin 1 of this embodiment, the molded resin articles 4 are arranged with respect to the core 2 in such a manner that the groove portions 4a and 4b can be aligned with the groove portions 2a and 2b of the core 2.

Figure 4:
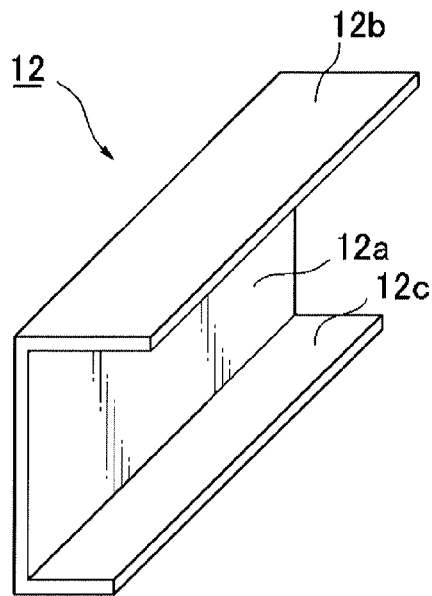
FIG. 4 is a perspective view of a bent insulating sheet constituting the motor bobbin of FIG. 1.

The bobbin 1 of this embodiment further includes insulating sheets 12. As shown in a perspective view of FIG. 4, each of the insulating sheets 12 has a U-shaped cross section having a center portion 12a, an upper bent portion 12b, and a lower bent portion 12c formed by bending upper and lower edge portions of a rectangular insulating sheet substantially at a right angle in the same direction.

As shown in FIG. 1, the insulating sheets 12 are attached to the core 2 and the molded resin articles 4 in such a manner that back surfaces of the center portions 12a of the insulating sheets 12 can be in contact with bottoms of the groove portions 2a and 2b of the core 2 and bottoms of the groove portions 4a and 4b of the molded resin articles 4 arranged in an aligned manner.

In the motor bobbin 1 of this embodiment, many horizontally extending grooves 14 for positioning a coil are formed all over a side surface 6a, which faces outward, of the main body portion 6 of each molded resin article 4.

As shown in FIG. 7, the bobbin 1 having such a configuration is fabricated by arranging the core 2 and the insulating sheets 12 in a mold in such a manner that the insulating sheets 12 can have the arrangement with respect to the core 2 as shown in FIG. 1 (step 702). As the mold, a mold is used in which spaces having the same shapes as those of the molded resin articles 4 remain inside the mold, when the core 2 and the insulating sheets 12 are arranged inside the mold as described above. By injecting a resin form forming the molded resin articles 4 into the mold (step 703), the spaces having the same shapes as those of the molded resin articles 4 are filled with the resin (step 704), and the bobbin 1 as shown in FIG. 1 is obtained (step 705).

Figure 5:
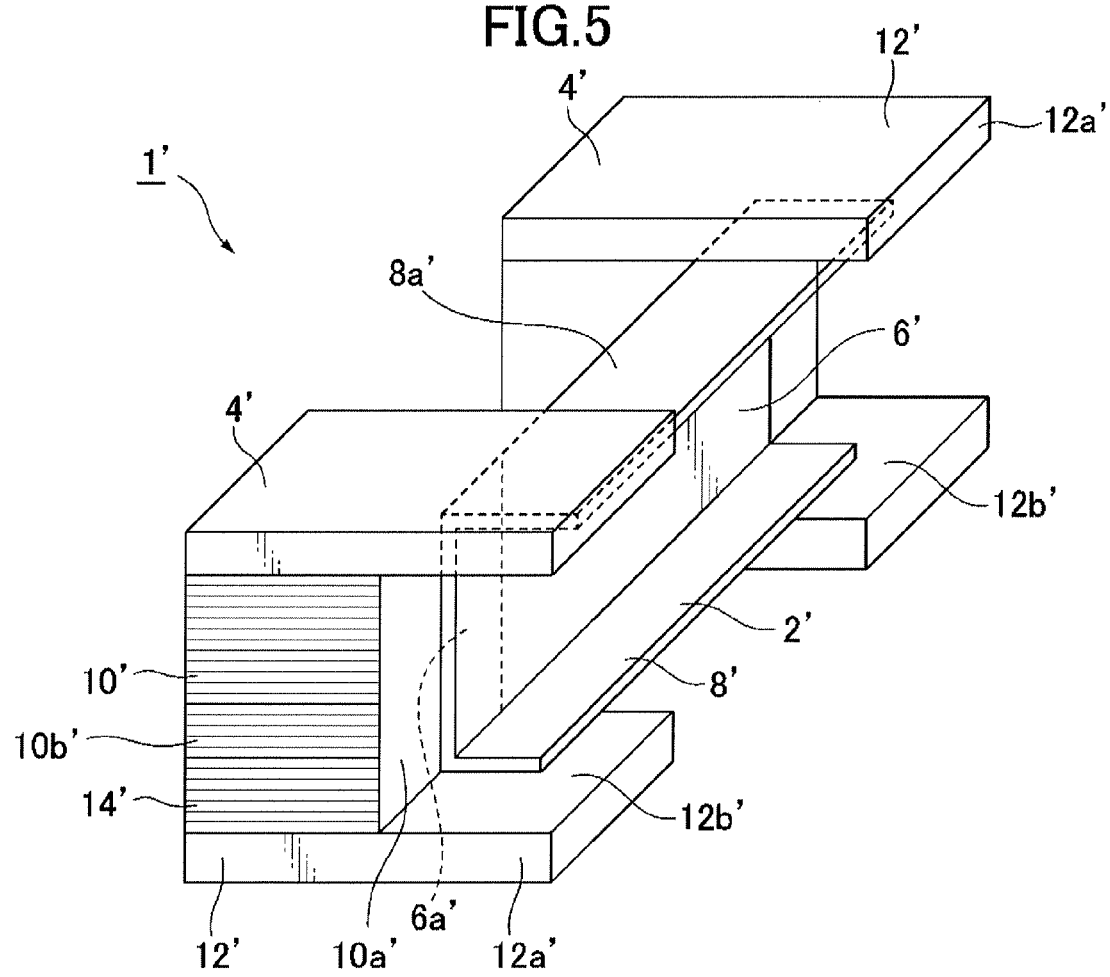
FIG. 5 is a perspective view of a motor bobbin of a comparative example.

FIG. 5 is a perspective view of a motor bobbin 1' of a comparative example.

The motor bobbin 1' comprises a bobbin body 2' having a U-shaped cross section and a pair of molded resin articles 4' attached to both ends of the bobbin body 2'.

The bobbin body 2' is formed to have a U-shaped cross section by bending edge portions on both sides of a rectangular insulating sheet at a substantially right angle in the same direction, and includes a center portion 6' and a pair of bent portions 8', 8a' at edges on both side.

Each molded resin article 4' includes a cuboid main body portion 10' and a pair of eave portions 12', 12' provided at both ends of the main body portion 10'. In the motor bobbin 1' of the comparative example, the main body portion 10' and the pair of eave portions 12', 12' are formed integrally with each other. The eave portions 12' have the same shape, and a tip side portion of each eave portion 12' is formed into an extending portion 12a' extending from the main body portion 10'. Consequently, the molded resin article 4' has a substantially U-shaped cross section. In addition, in the molded resin article 4', a space is formed which has a rectangular cross section and which is surrounded in three directions by the inner surfaces 12b' of the extending portions 12a' of the eave portions 12' and a side surface 10a' of the main body portion 10' on an extending side of the extending portions 12a'. The distance between the inner surfaces 12b' of the extending portions 12a' of each pair of the eave portions 12' is substantially equal to the width of the center portion 6' of the bobbin body 2'.

Each of the two ends of the bobbin body 2' in the longitudinal direction is connected to the corresponding one of the molded resin articles 4'. Specifically, the bobbin body 2' having the U-shaped cross section is connected and fixed to the molded resin articles 4' at each of the two ends of the bobbin body 2' in such a manner that an outer surface 6a' of the center portion 6' is joined to the side surface 10a' of the main body portion 10' of the molded resin article 4', and outer surfaces 8a' of the bent portions 8' are joined to the inner surfaces 12b' of the extending portions 12a' of the molded resin article 4'.

In the motor bobbin 1' of the comparative example, many horizontally extending grooves 14' for positioning a coil are formed all over a side surface 10b', which faces outward, of the main body portion 10' of each molded resin article 4'.

Figure 6:
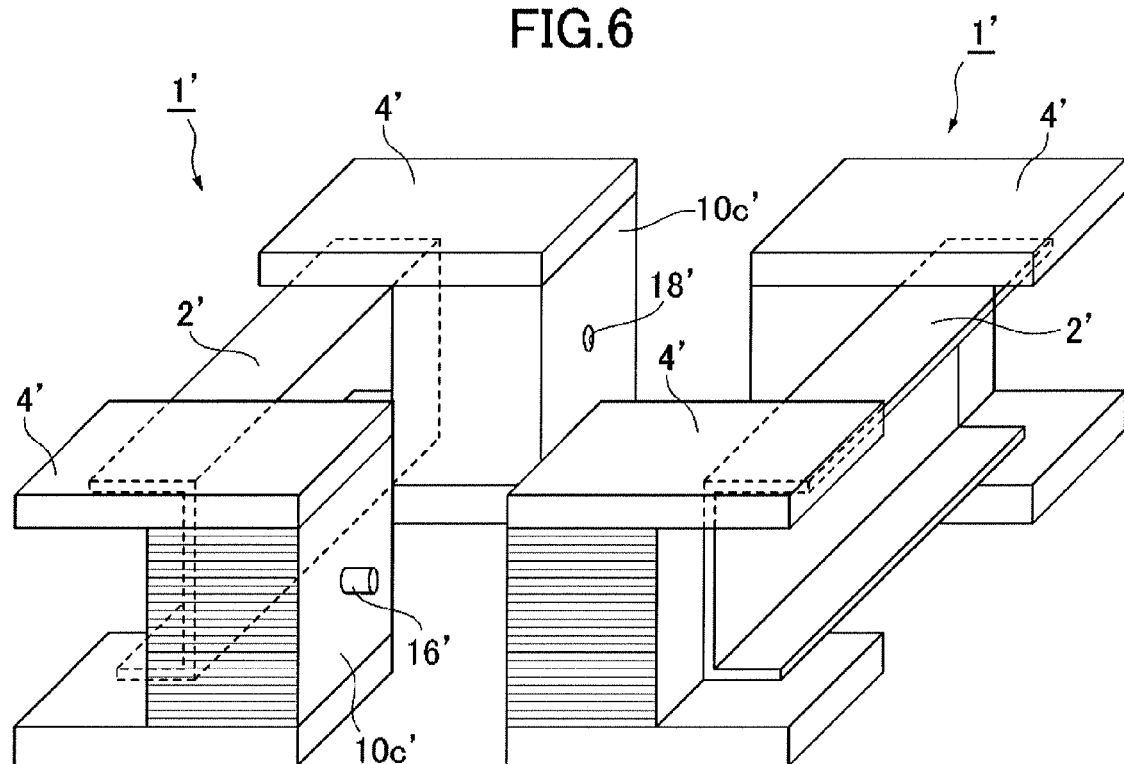
FIG. 6 is a perspective view showing an arrangement of the motor bobbin of FIG. 5 in a case where the motor bobbin is combined with a stator core.

As shown in FIG. 6, in the motor bobbin 1' of the comparative example, a protrusion 16' is formed on a back surface 10c' of the main body portion 10' of one of the molded resin articles 4', and a recessed portion 18' is formed on a back surface 10c' of the main body portion 10' of the other one of the molded resin articles 4'. The protrusion 16' and the recessed portion 18' are used when a pair of the motor bobbins 1' are arranged away from each other in the arrangement as shown in FIG. 6, and connected to a stator core arranged between the pair of the motor bobbins 1'.

(Insulating Sheet)

In the present invention, a paper sheet, nonwoven fabric, or film having insulating properties, a composite material thereof, or a laminated sheet thereof can be used as an insulating sheet. Examples of the insulating sheet include insulating papers such as an aramid paper comprising an aramid fibrid and an aramid short fiber, plastic films such as a polyphenylene sulfide film, a polyimide film, a polyetheretherketone film, a polyethylene terephthalate film, or a polyethylene naphthalate film, and laminated sheets thereof. Especially, the insulating sheet is preferably a laminated sheet which includes an aramid paper comprising an aramid fibrid and an aramid short fiber on at least one surface. Here, any suitable adhesive agent generally used in the technical field can be used as an adhesive agent used for laminating the aramid paper. Examples of the adhesive agent include, but are not limited to, epoxy-based, acrylic-based, phenol-based, polyurethane-based, silicon-based, polyester-based, and amide-based adhesive agents, and the like. In addition, in the case of lamination of the above-described film by using the adhesive agent, the film is almost always oriented, and hence the laminated sheet tends to deform because of shrinkage when the motor bobbin is manufactured by a melt injection molding method of the present invention described later. Hence, it is preferable to use a laminated sheet obtained by heating a stack of a film formed by melting a polymer and the aramid paper under pressure to impregnate the aramid paper with the molten polymer; a laminated sheet obtained by heating under pressure a paper making product (web) of a polymer and an aramid paper which have been integrated together during the papermaking or stacked together to impregnate the aramid paper with the molten resin; a laminated sheet obtained by melt-extruding a resin onto an aramid paper and thermally melt-bonding them; or the like.

The number of layers in the laminated sheet can be selected, as appropriate, depending on the application and purpose of the laminate. For example, the laminated sheet may be a laminated sheet including two layers of a polymer and an aramid paper, the polymer being made of an aromatic polyamide resin and an epoxy group-containing phenoxy resin having an epoxy group(s) in its molecule and having a ratio of the epoxy group-containing phenoxy resin of 30 to 50% by mass, the laminated sheet being fabricate by a method of melt-extruding and thermally melt-bonding the resins onto the aramid paper, or may be a laminated sheet including three layers of an aramid paper, the polymer, and an aramid paper, as described in Japanese Patent Application Publication No. 2006-321183. However, the number of the layers in the laminate is not limited thereto.

If the adhesion between the insulating sheet and a molded resin article described later is so insufficient that they are separated from each other during winding of a coil, it is preferable to perform a surface treatment on a surface of the insulating sheet to be in contact with the molded resin article in order to improve the adhesion. Here, the surface treatment may be a plasma surface treatment, a corona surface treatment, a surface treatment based on immersion in a liquid, or the like. By conducting such a surface treatment, the surface energy of the surface of the insulating paper is improved, and the interfacial energy with the molded resin article is lowered, so that the adhesion to the molded resin article is improved. A plasma surface treatment is particularly preferable because the treatment is easy to perform.

The thickness of the insulating sheet can be selected, as appropriate, depending on the application and purpose of the insulating sheet, and any thickness can be selected, unless the thickness causes any trouble in processability during bending, winding, or the like. In general, an insulating sheet having a thickness in a range from 50 µm to 1000 µm (particularly preferably 70 to 200 µm) is preferable from the viewpoint of the processability, but the thickness is not limited thereto.

(Aramid)

In the present invention, an aramid means a linear polymeric compound (aromatic polyamide) in which 60% or more of amide linkages are directly bonded to aromatic rings. Examples of such an aramid include poly(meta-phenylene isophthalamide), copolymers thereof, poly(para-phenylene terephthalamide), copolymers thereof, poly(para-phenylene)-copoly(3,4'-diphenyl ether)terephthalamide, and the like. These aramids are industrially manufactured by, for example, a conventionally known interfacial polymerization method, solution polymerization method, or the like using isophthalic chloride and m-phenylenediamine, and are available as commercial products. However, the aramids are not limited thereto. Of these aramids, poly(meta-phenylene isophthalamide) is preferably used, because it has excellent characteristics such as formability, thermal bonding characteristics, flame retardancy, and heat resistance.

(Aramid Fibrid)

In the present invention, an aramid fibrid is film-like aramid particles having a property of being formed into paper, and is also referred to as an aramid pulp (see Japanese Examined Patent Application Publication Nos. Sho 35-11851 and Sho 37-5732, etc.).

It is well known that an aramid fibrid is used as a paper-making raw material after being subjected to disintegration treatment and beating/refining treatment, as in the case of ordinary wood pulp. To keep the quality suitable for paper making, a so-called beating/refining treatment can be conducted on the aramid fibrid. This beating/refining treatment can be conducted by using a disk refiner, a beater, or other paper-making raw material-processing apparatuses exerting a mechanical cutting effect. In this operation, the morphological change of the fibrid can be monitored by the drainability (freeness) testing method specified in Japanese Industrial Standard P 8121. In the present invention, the freeness of the aramid fibrid subjected to the beating/refining treatment is preferably in a range from 10 cm$^3$ to 300 cm$^3$ (Canadian freeness (JIS P 8121)). A fibrid having a freeness above this range may lead to decrease in strength of an aramid paper formed from the fibrid. On the other hand, when an attempt is made to obtain a freeness below 10 cm$^3$, the efficiency of utilization of the inputted mechanical power is lowered, and the amount of processing per unit time decreases in many cases. Moreover, the fibrid becomes excessively fine, so that the so-called binder function tends to decrease. Hence, no significant advantage is seen by obtaining a freeness smaller than 10 cm$^3$ as described above.

(Aramid Short Fiber)

An aramid short fiber is one obtained by cutting a fiber made of an aramid. Examples of such a fiber include those available under the trade names of "TEIJIN CONEX (registered trademark)" of Teijin Limited, "NOMEX (registered trademark)" of DuPont, and the like, but are not limited thereto.

The length of the aramid short fiber can be selected in a range generally from 1 mm inclusive to 50 mm exclusive, and preferably from 2 to 10 mm. If the length of the short fiber is less than 1 mm, mechanical characteristics of a sheet material deteriorate. On the other hand, a short fiber having a length of 50 mm or more tends to undergo "entanglement", "bundling", and the like during manufacturing of an aramid paper by a wet method, and hence tends to cause defects.

(Aramid Paper)

In the present invention, an aramid paper is a sheet-like article mainly constituted of the above-described aramid fibrid and aramid short fiber. The aramid paper has a thickness in a range generally from 20 μm to 1000 μm, and preferably from 25 to 200 μm. Moreover, the aramid paper has a basis weight in a range generally from 10 g/m$^2$ to 1000 g/m$^2$, and preferably from 15 to 200 g/m$^2$. Here, the aramid fibrid and the aramid short fiber can be mixed at any ratio. The aramid fibrid/aramid short fiber ratio (mass ratio) is preferably 1/9 to 9/1, more preferably 2/8 to 8/2, and particularly preferably 3/7 to 7/3, but is not limited to this range.

In general, the aramid paper is manufactured by a method in which the above-described aramid fibrid and aramid short fiber are mixed with each other and then a sheet is formed from the mixture. Specific examples of employable methods include a method in which the aramid fibrid and the aramid short fiber are dry blended with each other, and then a sheet is formed by using an air stream; a method in which the aramid fibrid and the aramid short fiber are dispersed in a liquid medium and mixed with each other, then a sheet is formed by discharging the dispersion onto a liquid permeable support such as a wire or a belt, and then the liquid is removed from the sheet, which is then dried; and the like. Of these methods, a so-called wet paper making method is preferably selected in which water is used as the medium.

In general, in the wet paper making method, aqueous slurries containing at least the aramid fibrid and the aramid short fiber or an aqueous slurry containing a mixture thereof is fed to a paper machine and dispersed, followed by water-draining, water-squeezing, and drying operations, and then the paper is wound as a sheet. As the paper machine, a Fourdrinier paper machine, a cylinder paper machine, an inclined-type paper machine, a combination paper machine in which any ones of these paper machines are combined, or the like is used. In the case of manufacture using a combination paper machine, it is possible to obtain a composite sheet comprising multiple paper layers by forming sheets from slurries having different mixing ratios and integrating these sheets together. If necessary, additives such as a dispersibility improver, a defoamer, and a strengthening agent are used in the papermaking.

The density and mechanical strength of the aramid paper obtained as described above can be improved by hot-pressing the aramid paper between a pair of rolls at high temperature and high pressure. For example, when metal rolls are used, the hot-pressing conditions are, for example, that the temperature is in a range from 100 to 400° C. and the linear pressure is in a range from 50 to 400 kg/cm, but are not limited thereto. It is also possible to laminate multiple aramid papers during the hot-pressing. The above-described hot pressing can be conducted multiple times in any order.

(Molded Resin Article)

In the present invention, a molded resin article refers to a molded article fabricated by a melt injection molding method in which, for example, a PPS resin (polyphenylene sulfide resin), an acrylonitrile-butadiene-styrene copolymer resin, a polyimide-based resin, a polyethylene terephthalate-based resin, a polyacetal-based resin, a polymer having amide linkages such as polyamide 6, polyamide 66, polyamide 612, polyamide 11, polyamide 12, copolymerized polyamide, polyamide MXD6, polyamide 46, methoxymethylated polyamide, or a semi-aromatic polyamide, a polymer containing a polyamide resin composition as shown in Japanese Patent Application Publication No. 2006-321951, a mixture thereof, or a mixture of any of these polymers with an inorganic material such as glass fiber in a molten state is injected into a desired mold, and detached from the mold after cooling. A molded article of a mixture of a semi-aromatic polyamide with glass fiber is particularly preferably because the heat resistance is high and the adhesion to the laminated sheet including the aramid paper is good. Examples of the mixture include Zytel (registered trademark) HTN 51G and 52G of DuPont, and the like, but are not limited thereto.

It is preferable to form grooves for positioning a coil in a portion of the molded resin article to be in contact with a coil, because this stabilizes the position of the coil, and enables regular winding of the coil with high precision, which brings about an effect of improving the efficiency of a motor generator or the like.

(Method for Manufacturing Motor Bobbin)

In a manufacturing method of the present invention, an insulating sheet and a core member are inserted in a cavity for injection molding. In this state, the insulating sheet is arranged in advance so shat the insulating sheet can be at least partially in contact with a molten portion of a molded resin article. In this manner, at least a surface portion of the insulating sheet can be impregnated with the molten polymer. The fabrication of the motor bobbin in which the portion of the molded resin article and the insulating sheet are connected and fixed to each other as described above makes it possible to conduct the connection and fixation simultaneously with the fabrication of the molded resin article, while eliminating the need for the use of an adhesive agent. Here, the impregnation means that the molten polymer enters void portions of the insulating sheet. Particularly when the insulating sheet includes the aramid paper, the impregnation means that the molten polymer enters spaces among pieces of the aramid fibrid and/or the aramid short fiber constituting the aramid paper. The voids of the aramid paper account for about 15 to 80% of the aramid paper. Regarding the degree of the impregnation, it is preferable that 5% or more of the voids be impregnated, and it is further preferable that 20% or more of the voids be impregnated. However, the degree of the impregnation is not limited thereto. The impregnation increases the contact area between the polymer and the aramid paper, so that the bonding between the molded resin article and the insulating sheet is strengthened. Note that, specifically, the degree of the impregnation can be checked from the increase in density of the insulating sheet portion.

In addition, the injection molding is conducted with the core member inserted in the cavity. This eliminates the need for the connecting portions, which are necessary when a motor bobbin alone is molded. In addition, the expansion of the resin and the core member due to the change in temperature during the molding leads to the improvement in closeness of the contact between the insulating sheet and the core member. Hence, heat generated by a coil is efficiently transmitted to the core member, which prevents excessive increase in temperature, and reduces the copper loss of the coil, so that the output of the motor is improved.

Hereinafter, the present invention will be described based on Examples. Note that these Examples are provided for describing the content of the present invention by showing examples, and the content of the present invention is not limited to these Examples at all.

EXAMPLES

Measurement Methods (1) Measurement of Basis Weight and Thickness
The basis weight and the thickness were measured in accordance with JIS C 2300-2.
(2) Calculation of Density
The density was calculated by dividing the basis weight by the thickness.
(3) Tensile Strength and Tensile Elongation
The tensile strength and the tensile elongation were measured in accordance with JIS C 2300-2.
(4) Adhesion
The bonding portion between an insulating sheet and a molded resin article was visually observed. A bonding portion without any wrinkle (raised portion in the insulating sheet) was rated as "Good", whereas a bonding portion having a wrinkle(s) was rated as "Poor".
(5) Appearance of Insulating Sheet Portion
The degree of warp of the insulating sheet portion due to heat during the molding was visually determined.
(6) Closeness of Contact Between Insulating Sheet Portion and Core Member
The degree of closeness of contact between the insulating sheet portion and the core member was determined as follows. Specifically, a motor bobbin including a core member was impregnated with an epoxy resin. After curing, the motor bobbin including the core member was cut at a center portion (3 in FIG. 1) with a garnet fine particle-containing water jet (model 626 manufactured by OMAX Corporation) to prepare a cross section, and an average value of the distances between the insulating sheet portion of the bobbin body portion and the core member (2c in FIG. 2) was determined.

Reference Example

Preparation of Raw Materials

A fibrid of poly(meta-phenylene isophthalamide) was manufactured by using an apparatus (wet-deposition apparatus) for manufacturing pulp particles constituted of a combination of a stator and a rotor described in Japanese Patent Application Publication No. Sho 52-15621. This fibrid was treated by using a disintegrator and a beater/refiner to adjust the length-weighted mean fiber length to 0.9 mm. The freeness of the obtained aramid fibrid was 90 cm$^3$.

Meanwhile, a meta-aramid fiber (NOMEX (registered trademark), single yarn fineness: 2 denier) manufactured by DuPont was cut into pieces having a length of 6 mm (hereinafter referred to as "aramid short fiber".
(Manufacturing of Aramid Papers)
The prepared aramid fibrid and aramid short fiber were each dispersed in water to prepare slurries. These slurries were mixed with each other with the mixing ratio (weight ratio) of the fibrid and the aramid short fiber being 1/1, and a sheet-like article was fabricated by using a TAPPI-type manual paper machine (cross sectional area: 625 cm$^2$). Subsequently, this sheet-like article was hot pressed with metal calender rolls at a temperature of 330° C. and a linear pressure of 300 kg/cm. In such a manner, aramid papers shown in Examples 1 and 2 in Table 1 and Comparative Examples 1 and 2 in Table 2 were each obtained.
(Manufacturing of Laminated Sheets)
By using aramid papers (basis weight: 37 g/m$^2$, thickness: 51 μm, density: 0.73 g/cm$^3$) manufactured in the same manner as described above and a semi-aromatic polyamide resin composition containing 50% by weight of an epoxy group-containing phenoxy resin (Formulation Example 6 of Japanese Patent Application Publication No. 2006-321183), aramid paper-containing laminated sheets shown in Examples 3 and 4 in Table 1 and Comparative Examples 3 and 4 in Table 2 each having a three-layer structure of aramid paper/resin composition/aramid paper (with a weight ratio of 37/54/37) in which the aramid papers were arranged on outer sides were obtained by the method described in Paragraph [0024] of Japanese Patent Application Publication No. 2006-321183.

In addition, the above-described aramid papers (basis weight: 37 g/m$^2$, thickness: 51 μm, and density: 0.73 g/cm$^3$), and a polyethylene terephthalate film (S28 #16, thickness: 16 μm) manufactured by Toray Industries, Inc. were laminated on each other with an adhesive agent. In this manner, aramid paper-containing laminated sheets shown in Examples 5 and 6 of Table 1 and Comparative Examples 5 and 6 of Table 2 each having a three-layer structure of aramid paper/polyethylene terephthalate film/aramid paper (with a weight ratio of 37/54/37) in which the aramid papers were arranged on outer sides were obtained.
(Manufacturing of Core Members)
Pieces were punched out from a non-oriented electrical steel plate (thickness: 0.5 mm, thickness tolerance: 0.04 mm) specified in JIS C 2552, and the punched pieces of the steel plate were laminated on each other to produce core members for motor iron cores (FIG. 2).

Examples 1 and 2

Manufacturing of Motor Bobbins

Motor bobbins including core members as shown in FIG. 1 were each obtained by conducting insertion molding under the conditions shown in Table 1 by using, as insulating sheets, the corresponding ones of the aramid papers or the laminated sheets manufactured in Reference Example, and further by using the core member manufactured in Reference Example and, as a polymer, a semi-aromatic polyamide (Zytel (registered trademark) HTN 51G35G35EF) manufactured by DuPont. Specifically, (1) the core member was inserted in advance into a cavity for injection molding; (2) the insulating sheets were placed in advance at positions corresponding to end surfaces on both sides of a bobbin body portion; (3) the semi-aromatic polyamide manufactured by DuPont was introduced, and injection molded by a melt injection molding method to form a bobbin body portion in which molded resin articles are molded integrally with the insulating sheets and the core member. In this manner, each motor bobbin including the core member shown in FIG. 1 was obtained. In the motor bobbin, at least surface portions of the insulating sheets were impregnated with the molten polymer, and the insulating sheets were directly bonded to the surfaces of the molded resin articles. Table 1 shows values of main characteristics of the thus obtained motor bobbins.

From the results shown in Table 1, each of the motor bobbins of the examples, which has the bobbin body portion made of the insulating sheets, has a small thickness (maximum thickness: 135 to 140 μm), and hence is promising for increasing the efficiency by increasing the coil space factor of the coil. In addition, because of the sufficiently high tensile elongation, the insulating sheets can also follow the expansion of the core member due to the change in temperature before, during, and after the molding, so that the closeness of contact with the core is good, and the heat generated by a coil is efficiently transmitted to the core member. In addition, the connection and fixation between the insulating sheets and the molded resin articles are also sufficient. Hence, the breakdown voltage can also be expected to be sufficiently high. Moreover, the aramid papers and the polymer used are highly heat resistant, and hence it is conceivable that the aramid papers and the polymer can sufficiently withstand heat generated by a coil. Hence, it can be understood that each of the motor bobbins of the examples is useful as a motor bobbin capable of coping with an increased efficiency and an increased power output of a motor generator or the like. Especially, in each of Examples 3 and 4, the resin composition of the middle layers of the laminated sheets had a similar structure to that of the molded resin articles, and, presumably because of this, the laminated sheets were softened during the molding, and the obtained closeness of contact between the insulating sheets and the core member was the best.

TABLE 1

| characteristics | Unit | Ex. 1 | Ex. 2 | Ex. 3 | Ex. 4 | Ex. 5 | Ex. 6 |
|---|---|---|---|---|---|---|---|
| Insulating sheet | | | | | | | |
| Aramid paper | wt % | 3 | 3 | | | | |
| basis weight | g/m² | 115 | 115 | | | | |
| thickness | μm | 135 | 135 | | | | |
| density | g/cm³ | 0.87 | 0.87 | | | | |
| Laminated sheet | wt % | | | 3 | 3 | 3 | 3 |
| basis weight | g/m² | | | 128 | 128 | 128 | 128 |
| thickness | μm | | | 140 | 140 | 140 | 140 |
| density | g/cm³ | | | 0.91 | 0.91 | 0.91 | 0.91 |
| Tensile strength | kgf/15 mm | 17 | 17 | 15 | 15 | 24 | 24 |
| Tensile elongation | % | 15 | 15 | 13 | 13 | 18 | 18 |
| Polymer | | | | | | | |
| Semi-aromatic polyamide | wt % | 97 | 97 | 97 | 97 | 97 | 97 |
| Molding | | | | | | | |
| polymer temperature | ° C. | 322 | 322 | 322 | 322 | 322 | 322 |
| mold temperature | ° C. | 81 | 152 | 81 | 152 | 81 | 152 |
| Adhesion | | Good | Good | Good | Good | Good | Good |
| Appearance of Insulating Sheet Portion | | Good | Good | Good | Good | Slightly warped | Slightly warped |
| Closeness of contact between insulating sheet portion and core member | mm | 0.4 | 0.4 | 0.3 | 0.25 | 0.45 | 0.5 |

Comparative Examples 1 to 6

Manufacturing of Motor Bobbins

Motor bobbins as shown in FIG. 5 were each obtained by conducting insertion molding under conditions shown in Table 2 by using, as insulating sheets, the corresponding one of the aramid papers or the laminated sheets manufactured in Reference Example, and further by using a semi-aromatic polyamide (Zytel (registered trademark) HTN 51G35G35EF) manufactured by DuPont as a polymer. Specifically, (1) the insulating sheet was placed in advance in a cavity for injection molding at positions corresponding to end surfaces on both sides of a bobbin body portion; (2) the semi-aromatic polyamide manufactured by DuPont was introduced, and injection molded by a melt injection molding method to form a bobbin body portion in which molded resin articles were integrally molded with the insulating sheet and the core member. In this manner, each motor bobbin shown in FIG. 5 was obtained. In the motor bobbin, at least surface portion of the insulating sheet was impregnated with the molten polymer, and the insulating sheet was directly bonded to the surfaces of the molded resin articles. Moreover, the thus obtained motor bobbins were assembled with the core member manufactured in Reference Example as shown in FIG. 6. Table 2 shows values of main characteristics of the thus obtained motor bobbins.

From the results of Table 2, in each of Comparative Examples 1 to 6, it tended to be difficult to adjust the closeness of contact between the core member and the insulating sheet portions, and the spaces between the insulating sheets and the core member tended to be large, because the motor bobbins were assembled with the core member after fabrication of the bobbins. It is conceivable that this may cause decrease in efficiency of the transmission of heat generated by a coil to the core member in a case where the motor bobbins are used for a motor or the like, and on the other hand that this may cause a trouble in fitting the bobbins to a core member in a case where the thickness of the core member is increased within the tolerance, and also may cause other similar problems. Hence, the motor bobbins of each of Comparative Examples 1 to 6 are presumably insufficient as motor bobbins capable of coping with an increased efficiency and an increased power output of a motor generator or the like in comparison with those of Examples.

TABLE 2

| Characteristics | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Insulating sheet | | | | | | | |
| Aramid paper | wt % | 3 | 3 | | | | |
| basis weight | g/m$^2$ | 115 | 115 | | | | |
| thickness | μm | 135 | 135 | | | | |
| density | g/cm$^3$ | 0.87 | 0.87 | | | | |
| Laminated sheet | wt % | | | 3 | 3 | 3 | 3 |
| basis weight | g/m$^2$ | | | 128 | 128 | 128 | 128 |
| thickness | μm | | | 140 | 140 | 140 | 140 |
| density | g/cm$^3$ | | | 0.91 | 0.91 | 0.91 | 0.91 |
| Tensile strength | kgf/15 mm | 17 | 17 | 15 | 15 | 24 | 24 |
| Tensile elongation | % | 15 | 15 | 13 | 13 | 18 | 18 |
| Polymer | | | | | | | |
| Semi-aromatic polyamide | wt % | 97 | 97 | 97 | 97 | 97 | 97 |
| Molding | | | | | | | |
| polymer temperature | °C. | 322 | 322 | 322 | 322 | 322 | 322 |
| mold temperature | °C. | 81 | 152 | 81 | 152 | 81 | 152 |
| Adhesion | | Good | Good | Good | Good | Good | Good |
| Appearance of Insulating Sheet Portion | | Good | Good | Good | Good | Warped | Warped |
| Closeness of contact between insulating sheet portion and core member | mm | 0.6 | 0.6 | 0.6 | 0.6 | 0.7 | 0.8 |

The invention claimed is:

1. A method for manufacturing a motor bobbin around which a coil is to be wound, the method comprising:
    forming the motor bobbin by injection molding wherein an insulating sheet and a core member are arranged in a cavity of an injection mold; and
    a resin is injected into the cavity,
    wherein the motor bobbin comprises an insulating sheet and a molded resin article; and
    wherein the motor bobbin is further formed to comprise a center body portion which is at least partially made of only the insulating sheet.

2. The manufacturing method according to claim 1, wherein
    the motor bobbin is formed to further comprise another molded resin article, the molded resin article and the another molded resin article being respectively connected to a respective end of a body portion of the motor bobbin.

3. The manufacturing method according to claim 1, wherein
    connecting and fixing the insulating sheet and the molded resin article to each other without using an adhesive agent.

4. The manufacturing method according to claim 1, further comprising:
    impregnating a surface of the insulating sheet in contact with the molded rein article with the molded resin article.

5. The manufacturing method according to claim 1, wherein
    the molded resin article is formed to have a groove for positioning a coil.

6. The manufacturing method according to claim 1, wherein
    the molded resin article and the insulating sheet are bonded to each other simultaneously with the molding of the molded resin article.

7. The manufacturing method according to claim 1, further comprising:
    forming the molded resin article using a polymer having an amide bond, and
    providing a surface of the insulating sheet in contact with the molded resin article as an aramid paper comprising an aramid fibrid and an aramid short fiber.

8. A motor bobbin which is fabricated by the manufacturing method according to claim 1.

9. A motor comprising a stator obtained by winding a coil around the motor bobbin formed by the manufacturing method according to claim 8.

10. A motor generator comprising a stator obtained by winding a coil around the motor bobbin formed by the manufacturing method according to claim 8.

11. A power generator comprising a stator obtained by winding a coil around the motor bobbin formed by the manufacturing method according to claim 8.

* * * * *